United States Patent [19]
Anderson et al.

[11] 4,351,155
[45] Sep. 28, 1982

[54] WASTE HEAT RECOVERY SYSTEM FOR AN INTERNAL COMBUSTION ENGINE

[76] Inventors: Forest L. Anderson, 12186 Melody Dr., #103, Denver, Colo. 80234; Robert H. Nation, 13164 Elk Pl., Denver, Colo. 80239

[21] Appl. No.: 204,855

[22] Filed: Nov. 7, 1980

[51] Int. Cl.³ .............................................. F01K 23/10
[52] U.S. Cl. ...................................................... 60/618
[58] Field of Search ......................... 60/616, 618, 620; 165/10 A

[56] References Cited
U.S. PATENT DOCUMENTS

| | | | |
|---|---|---|---|
| 3,830,062 | 8/1974 | Morgan | 60/618 |
| 4,031,705 | 6/1977 | Berg | 60/618 |
| 4,250,866 | 2/1981 | Telkes | 165/10 A |

Primary Examiner—Douglas Hart
Attorney, Agent, or Firm—W. Scott Carson

[57] ABSTRACT

A method and apparatus for recovering and utilizing waste heat from the exhaust and coolant of an internal combustion engine. The waste heat recovery system uses two separate and closed circuits of working fluid with one circuit being heated by the exhaust gases and the other being heated by the engine coolant. In the preferred embodiment, two different working fluids are used and each circuit is designed to operate at temperatures and pressures most efficient for that particular working fluid and the heat available from the exhaust in one case and the coolant in the other case. A heat exchanger is provided between the two circuits for increased efficiency and a heat reservoir of melted salt is built into the exhaust heated circuit to minimize surges in the system and to provide reserve power during high performance demands. In the preferred embodiment, the work produced by the exhaust heated circuit is sequentially added to the power output of the engine and vane expanders rather than turbines are used for a more direct and efficient coupling of the available work from the recovered waste heat to the power output of the engine.

22 Claims, 5 Drawing Figures

WASTE HEAT RECOVERY SYSTEM FOR AN INTERNAL COMBUSTION ENGINE

FIELD OF THE INVENTION

This invention relates to the field of waste heat recovery systems and more particularly to the field of waste heat recovery systems for internal combustion engines.

BACKGROUND OF THE INVENTION AND PRIOR ART

Increasing the efficiency of internal combustion engines, particularly automobile and truck engines, has been a continuing challenge to engineers and designers alike ever since the advent of the engine itself. In this area, much progress has been made in increasing the efficiency with which fuel is burned in such engines as by improvements in carburetors, air-fuel mixing systems, and fuel vaporizers. However, little progress has been made in successfully recovering and utilizing the waste heat from such internal combustion engines, particularly the waste heat in their exhaust gases and coolant which can typically represent 60% or more of the energy available from the burned fuel. As compared to systems that concentrate on increasing the efficiency of the fuel burning process within the engine, waste heat recovery systems must be more precisely designed if any significant gains are to be achieved because much of the energy available in the waste heat is at a lower energy level. Further, to achieve any worthwhile gains, a waste heat recovery system must not only recover as much of the waste heat as possible but also return it to the power output of the engine in a direct and efficient manner.

By far, the vast majority of waste heat recovery systems for internal combustion engines use a single circuit of working fluid (typically freon) wherein waste heat from the engine's lubricant, coolant, and/or exhaust is progressively added in steps to the freon. Examples of such systems are U.S. Pat. Nos. 3,228,189 to Baker; 3,554,849 to Wagner; 3,888,084 to Hawkins; 3,945,210 to Chapin; 4,003,034 to Bradley; 4,069,672 to Milling; and 4,099,489 to Bradley. Such systems are fundamentally defective in design because the recovered heat from the lubricant and coolant is not productively used. Specifically, the difference in available energy between the exhaust gases and the lubricant and coolant is so great that virtually all of the energy added to the freon is from the exhaust and the heat exchanges with the lubricant and the coolant might as well be eliminated. Also, since the exhaust is fully capable of heating the freon to its maximum operating temperature by itself, this pre-heating by the lubricant and coolant means that less heat is extracted from the hot exhaust and more of the energy of the hot exhaust is inefficiently expelled into the atmosphere. Further, most such systems use the recovered heat to drive turbines which must be operated at such high speeds to be efficient that a gear down arrangement must be provided to couple the work of the turbine to the drive or crank shaft of the typical engine. As a practical matter, this is somewhat of a self-defeating proposition since much of the gain from the turbine is lost in the added weight and operation of the gear down arrangement.

Several patented systems such as U.S. Pat. No. 4,031,705 to Berg and U.S. Pat. No. 3,830,062 to Morgan are of interest for their realization of the fundamental defects in the series type recovery systems; however, none of these is really an efficient, workable alternative. Berg, for example, has parallel heat exchangers for the exhaust and coolant but then recombines the heated freon before extracting work from it. The real effect of this recombining is to reduce the temperature of the freon from the exhaust exchanger and thus reduce the temperature and energy of the freon entering the expander. Like Berg, Morgan has parallel heat exchangers for the exhaust and coolant but unlike Berg, Morgan also has parallel turbines and does not recombine the exhaust and coolant heated freon before extracting work from it. Still, Morgan's design is deficient in several areas especially if it were to be applied to automobile and truck engines. Notably, he wastes energy pre-heating the freon prior to its entering the exhaust heat exchangers. This pre-heating prior to the freon entering the exhaust heat exchanger is unnecessary since the waste heat from the exhaust can more than adequately heat the freon to its maximum operating temperature by itself. Further, this pre-heating means that less heat is extracted from the hot exhaust and more of the energy of the hot exhaust is inefficiently expelled and lost to the atmosphere. Other patents in this general field are U.S. Pat. Nos. 2,919,540 to Percival; 3,948,235 to Gamell; 3,979,913 to Yates; 4,007,594 to Elsea; and 4,120,157 to Tang.

It was with the drawbacks and deficiencies of systems such as these in mind that the present waste heat recovery system was developed. In the present system, two separate and closed circuits of working fluids are used for maximum efficiency. One circuit operates off a heat exchanger with the exhaust and the other operates off a heat exchanger with the coolant. For increased efficiency, each circuit has a different working fluid and operates at temperatures and pressures most efficient for that particular fluid and the heat available from the exhaust in one case and the coolant in the other case. There is also a heat exchanger between the two circuits for further efficiency and a direct coupling of the work produced from each circuit to the power output of the engine. In the preferred embodiment, the work produced by the exhaust heated circuit is sequentially added to the power output of the engine and a heat reservoir of melted salt is built into the exhaust heated circuit to minimize surges in the system and to provide power during high performance demands.

SUMMARY OF THE INVENTION

This invention involves a method and apparatus for recovering and utilizing waste heat from an internal combustion engine and is particularly adapted for use with automobile and truck engines. The preferred embodiment of the invention is designed to recover waste heat from both the exhaust and coolant of the engine and to couple the available work from this waste heat to the power output of the engine in a direct and efficient manner. The waste heat recovery system of the present invention uses two separate and closed circuits of working fluid with one circuit being heated by the exhaust gases and the other being heated by the engine coolant. In the preferred embodiment, two different working fluids are used and each circuit is designed to operate at temperatures and pressures most efficient for that particular working fluid and the heat available from the exhaust in one case and the coolant in the other case. A heat exchanger is provided between the two circuits for further efficiency and a heat reservoir of melted salt is built into the exhaust heated circuit to minimize surges in the system and to provide reserve power during high performance demand. In the preferred embodiment, the work produced by the exhaust heated circuit is sequentially added to the power output of the engine and vane expanders rather than turbines are used for a more efficient coupling of the available work from the recovered waste heat to the power output of the engine.

DETAILED DESCRIPTION OF THE PREFERRED EMBODIMENTS

Figure 1:
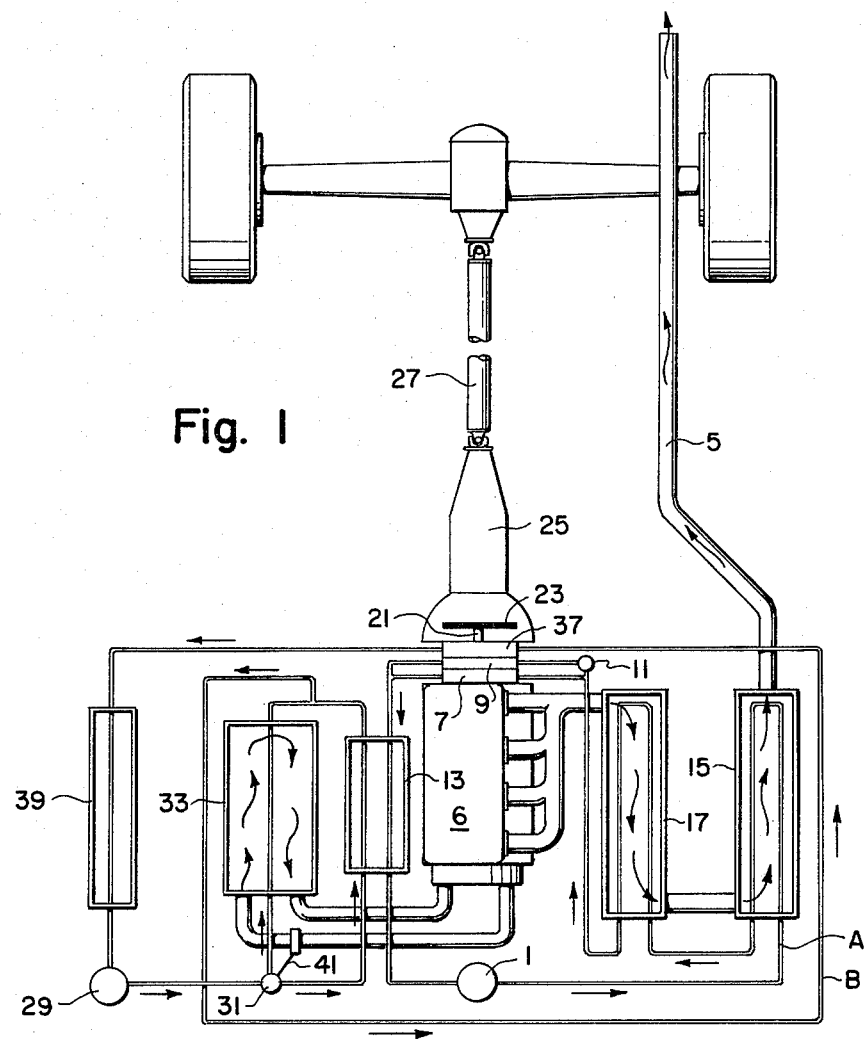
FIG. 1 is a schematic drawing showing the waste heat recovery system of the present invention and its relationship to the drive train of a conventional automobile or truck.
Figure 2:
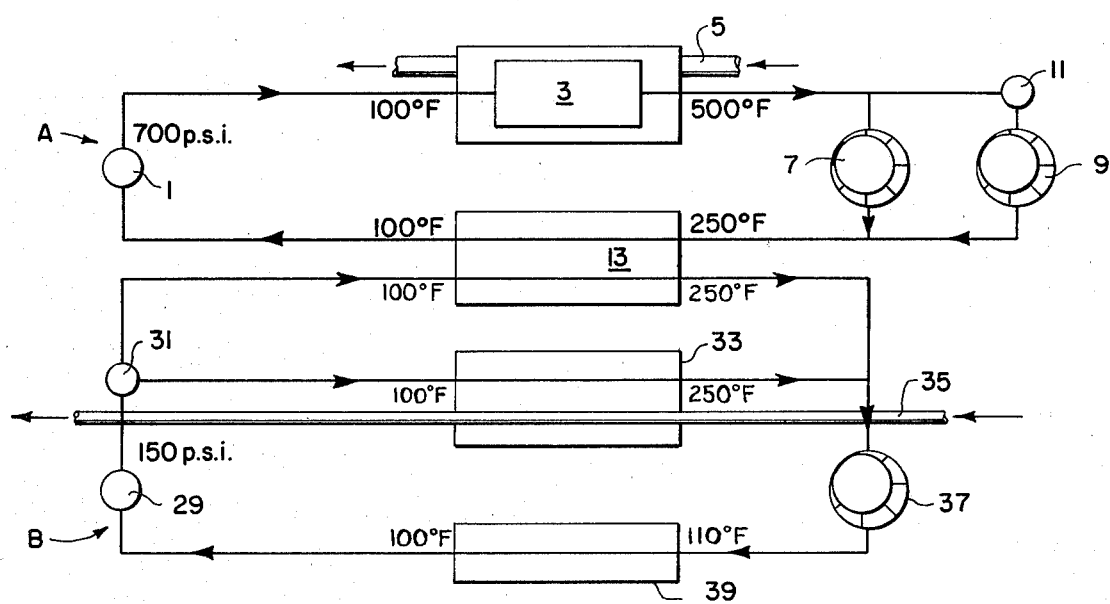
FIG. 2 is a second and simplified schematic drawing of the waste heat recovery system of the present invention illustrating the basic elements of the system.

Referring to FIGS. 1 and 2, the waste heat recovery system of the present invention uses two separate and closed circuits A and B of working fluid. The first circuit A recovers waste heat from the engine's exhaust and the second circuit B recovers waste heat from the engine's coolant.

Figure 3:
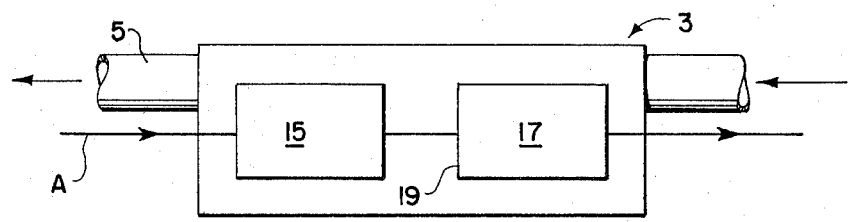
FIG. 3 is a schematic of the simplified heat exchanging arrangement 3 of FIG. 2 showing the relationship of the conventional heat exchanger 15, salt heat exchanger 17, and flow of the exhaust gases 5.

As best seen in the simplified schematic of FIG. 2, the working fluid in the first circuit A is pumped at 1 in a liquified state to a heat exchanger arrangement 3 at a first location where it is vaporized by a heat exchange with the exhaust gases 5 of the engine 6. The working fluid in circuit A then passes to the primary vane expander 7 and additionally to the secondary vane expander 9 (when pressures become high enough to open the valve 11) where the vaporized working fluid is expanded to produce work. The expanded working fluid is then condensed in a heat exchanger at 13 and passes in a liquified state to the pump 1 to begin a new cycle. In the preferred embodiment as shown in FIGS. 1 and 3, the heat exchanging arrangement 3 of FIG. 2 consists of a conventional heat exchanger 15 and a salt heat exchanger 17. Under operating conditions, the hot exhaust gases 5 melt the salt in the reservoir 19 wherein heat is stored in the melted salt as heat of fusion. Then, at times of high performance demands such as during accelerations from stops when the volume of exhasut gases 5 is often insufficient to fully vaporize the working fluid, the heat stored in the melted salt as heat of fusion can be used to ensure that the working fluid is fully vaporized. With the salt heat exchanger 17, surges in the system and acceleration lags can be minimized.

By way of example and for illustrative purposes only, it is contemplated that the operating pressure of the variable speed pump 1 in circuit A will be about 700 psia and the high side temperature and pressure of the vaporized working fluid entering the primary vane expander 7 will be about 500° F. and 700 psia. This high side temperature of the working fluid is largely determined by the melting temperature of the particular salt used in the system since the preferred path of the exhaust gases 5 in FIGS. 1 and 3 flows first through the salt heat exchanger 17 and then through the conventional heat exchanger 15. A contemplated salt for use in this system is zinc chloride which has a melting temperature of 503° F. and a boiling temperature well above the temperature of the exhaust gases 5 which typically are on the order of at least 850° for Otto cycle engines and at least 900° F. for diesel cycled engines.

Under normal running conditions, it is anticipated that the pressure of the vaporized working fluid entering the primary vane expander 7 will be about 700 psia; however, should the pressure rise significantly, as for example, to about 800 psia, then the valve 11 would automatically open to sequentially direct some of the flow to the secondary vane expander 9. The vane expanders 7 and 9 are preferably directly coupled in line to the engine's crankshaft 21 upstream of the clutch 23, transmission 25, and driveshaft 27 in FIG. 1 and are individually sized (e.g., by volume, vane dimensions) to operate most efficiently at their anticipated, normal operating pressures (700 psia and 800 psia respectively). The expanders 7 and 9 are also sized to match the anticipated engine speed that would be occurring during most of their operation (i.e., cruising speeds in the case of primary expander 7 and high speeds in the case of secondary expander 9). In normal operating modes, the expanded working fluid leaves the expander 7 at about 250° F. and about 23.5 psia based on a compression ratio of about 27.5:1 and a 75% isotropic efficiency for the expander 7. This expanded working fluid then passes to the heat exchanger 13 where heat is removed and the liquified working fluid passes at a temperature of about 100° F. to the pump 1 to begin a new cycle.

Referring again to the simplied schematic of FIG. 2, the second circuit B begins a cycle by pumping a liquified working fluid at 29 through a diverter valve 31 where it is selectively heated and vaporized in the heat exchanger 33 by the engine's coolant 35 and in the heat exchanger 13 by the heat removed from the first working fluid in circuit A as this first working fluid is condensed. The vaporized, second working fluid in circuit B then passes to the vane expander 37 where it is expanded to produce work. The expanded working fluid is then condensed at 39 and passes in a liquified state to the pump 29 to begin a new cycle. By way of example and for illustrative purposes only, it is contemplated that the operating pressure of the variable speed pump 29 is circuit B will be about 150 psia and the high side temperature and pressure of the vaporized working fluid entering the vane expander 27 will be about 250° F. and 150 psia. In normal operation, the second working fluid is expanded at 37 to 23.5 psia at 110° F. with a 6:1 compression ratio before advancing to the condenser 39 and onto the pump 29 in a liquified state to begin a new cycle.

It is contemplated that circuit B can adequately accommodate the heat of the engine coolant 35 by itself. In this light, the valve 31 has a thermostatic link 41 in FIG. 1 to the coolant wherein more working fluid is diverted by valve 31 to the heat exchanger 33 as the coolant temperature approaches a predetermined maximum.

In circuit B, the high side temperature of the working fluid is primarily dictated by the maximum temperature of the engine's coolant that has been set in this example at 250° F. (which is about the maximum temperature to which it can be raised in a conventional automobile or truck engine without having to significantly redesign the seals and radiator). As a practical matter, there is more flexiblity in setting the pressures and temperatures of circuit A so the operating parameters of the total waste heat recovery system of the present invention tend to be set by working backward from the maximum coolant temperature. In this light and with the maximum coolant temperature set at 250° F., the elements of the first circuit A are accordingly adjusted to produce a temperature as close as possible to 250° F. in the expanded, first working fluid as it enters the heat exchanger 13. Preferably, the coolant temperature would even be higher to promote more efficient fuel consumption within the engine and more work recovery from the system of the present invention.

Figure 4:
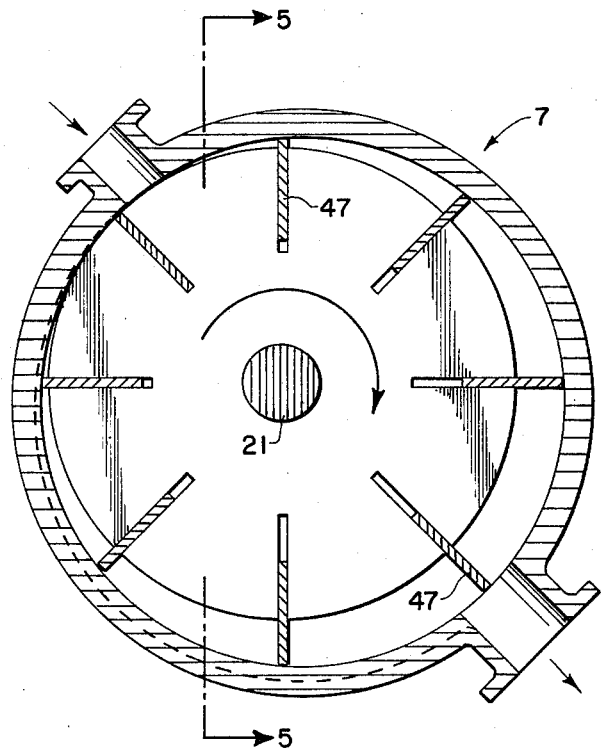
FIG. 4 is a cross-sectional view of one of the vane expanders used in the system.
Figure 5:
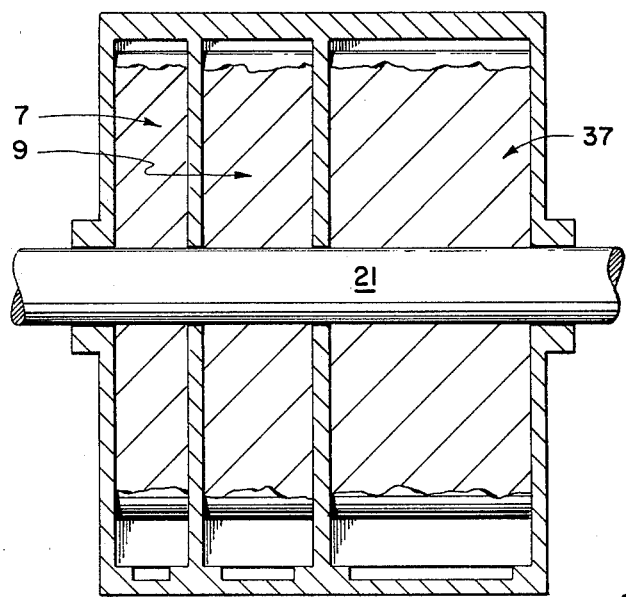
FIG. 5 is a view along line 5—5 of FIG. 4 illustrating the relationship of the three vane expanders of the system and their direct coupling to the crank shaft 21 of the engine.

One main advantage of the preferred embodiment of the present invention is that the circuits A and B are separate and closed. Consequently, two different working fluids can be used so that each circuit can be operated at temperatures and pressures most efficient for that particular fluid and the heat available from the exhaust in one case and the coolant in the other case. By way of example, it is contemplated that water and/or fluorinal 85 will be used in circuit A and a freon such as trichlorofluoromethane (commonly known as R-11) in circuit B. In choosing the working fluids, it is preferred that the fluid of circuit A be one for which the pressures in the circuit A go over the vapor dome of the fluid so it flashes to a gas in a supercritical cycle; and, it is preferred that the fluid for circuit B be one for which the pressures of circuit B stay outside of its vapor dome. It is also contemplated that a flywheel arrangement could be used in place of the salt for reserved power. However, the salt is preferred because more energy can be stored in it than in a comparably sized (volume and weight) fly wheel arrangement and it can be done without the added complexity of a fly wheel arrangement. In the preferred embodiment, vane expanders with their centrifugally sealing vanes 47 as shown in FIG. 4 are used instead of more conventional turbines because they can be more efficiently operated at lower speeds than turbines. Consequently, the vane expanders can be directly coupled to the crankshaft 21 without the need for gear down arrangements as would be necessary if conventional turbines were used.

While several embodiments of the present invention have been described in detal herein, various changes and modifications can be made without departing from the scope of the invention.

We claim:

1. A method primarily intended for recovering and utilizing waste heat from the exhaust and coolant of an internal combustion engine by using two separate and closed circuits of working fluid, said method comprising the steps of:
   (a) pumping a liquified, first working fluid to a first location along a first closed circuit,
   (b) vaporizing said first working fluid at said first location along said first circuit to a high side temperature and pressure by applying waste heat from said exhaust,
   (c) expanding said vaporized first working fluid in said first circuit to produce work,
   (d) condensing said expanded first working fluid to a liquid state by removing heat therefrom,
   (e) repeating steps (a)–(d) while simultaneously,
   (f) pumping a liquified, second working fluid along a second closed circuit,
   (g) vaporizing said second working fluid at at least one location along said second circuit to a high side temperature and pressure less than the high side temperature and pressure of said first circuit by selectively applying waste heat from said coolant and the removed heat of step (d),
   (h) expanding said vaporized working fluid in said second circuit to produce work,
   (i) condensing said expanded second working fluid to a liquid state, and
   (j) repeating steps (f)–(i).

2. The method of claim 1 further including the step of using two different working fluids in said first and second closed circuits.

3. The method of claim 1 further including the steps of using two different working fluids in said first and second closed circuits and substantially equating the high side temperature of the second working fluid in step (g) and the temperature of the expanded first working fluid at the end of step (c).

4. The method of claim 1 further including the steps of using two different working fluids in said first and second closed circuit and substantially equating the high side temperature of the second working fluid in step (g) and the maximum temperature of the coolant in step (g) and the temperature of the expanded first working fluid at the end of step (c).

5. The method of claim 1 further including the step of substantially equating the high side temperature of the second working fluid in step (g) and the temperature of the expanded first working fluid at the end of step (c).

6. The method of claim 1 further including the step of substantially equating the high side temperature of the second working fluid in step (g) and the maximum temperature of the coolant in step (g) and the temperature of the expanded first working fluid at the end of step (c).

7. The method of claim 1 wherein said internal combustion engine includes a crankshaft and said method further includes the step of coupling the work produced in at least one of steps (c) and (h) directly to said crankshaft.

8. The method of claim 7 further including the step of coupling the work produced in steps (c) and (h) directly to said crankshaft.

9. The method of claim 1 wherein said internal combustion engine includes a crankshaft and said method further includes the step of coupling the work produced in step (c) directly to said crankshaft at at least two distinct locations along said crankshaft.

10. The method of claim 9 further including the step of sequentially coupling the work produced in step (c) directly to said crankshaft at said at least two distinct locations along said crankshaft.

11. The method of claim 1 further including the steps of sensing the temperature of said coolant and selectively applying more waste heat from said coolant to said second working fluid in step (g) as the temperature of said coolant approaches a predetermined maximum.

12. The method of claim 1 wherein at least a portion of said waste heat from the exhaust is applied directly to the first working fluid in step (b) through a heat exchanger.

13. The method of claim 1 wherein at least a portion of said waste heat from the exhaust is applied indirectly to the first working fluid in step (b) by first melting a salt in one heat exchange step and then having the heat of fusion of the melted salt vaporize the first working fluid in a second heat exchange step.

14. A waste heat recovery system primarily intended for use with an internal combustion engine having a coolant system and exhaust system, said waste heat recovery system comprising:
   a first closed circuit with a first working fluid contained therein,
   means for pumping said first working fluid in a liquified state to a first location along said first closed circuit,
   means for vaporizing said first working fluid at said first location to a high side temperature and pressure by applying waste heat from said exhaust,
   means for expanding said vaporized first working fluid in said first circuit to produce work,
   means for condensing said expanded first working fluid to a liquid state by removing heat therefrom wherein said liquified, first working fluid passes along said first circuit to said pumping means and again through said first circuit,
   a second closed circuit separate from said first circuit and having a second working fluid contained therein,
   means for pumping said second working fluid in a liquified state to a first location along said second closed circuit,
   means for vaporizing said second working fluid at said first location of said second circuit to a high side temperature and pressure less than the high side temperature and pressure of said first circuit by selectively applying waste heat from said coolant and the removed heat of the condensing means of said first circuit,
   means for expanding said vaporized second working fluid in said second circuit to produce work, and,
   means for condensing said expanded second working fluid to a liquid state wherein said liquified, second working fluid passes along said second circuit to said pumping means therefor and again through said second circuit.

15. The waste heat recovery system of claim 14 wherein said first and second working fluids are different.

16. The waste heat recovery system of claim 14 wherein said engine includes a crankshaft and said waste heat recovery system further includes means for coupling the work produced by at least one of said expanding means of said first and second circuits directly to said crankshaft.

17. The waste heat recovery system of claim 14 wherein said engine includes a crankshaft and said waste heat recovery system further includes respective means for coupling the work produced by each of the expanding means of said first and second circuits directly to said crankshaft.

18. The waste heat recovery system of claim 14 wherein said engine includes a crankshaft, said expanding means of said first circuit includes first and second expanders, and said waste heat recovery system further includes respective means for coupling the work produced in each of said first and second expanders directly to said crankshaft at two distinct locations along said crankshaft.

19. The waste heat recovery system of claim 18 further including means for sequentially coupling the work produced in said first and second expanders to said crankshaft.

20. The waste heat recovery system of claim 14 further including means for sensing the temperature of said coolant and means for selectively applying more waste heat from said coolant to said second working fluid as the temperature of said coolant approaches a predetermined maximum.

21. The waste heat recovery system of claim 14 further including means for temporarily storing waste heat from said exhaust and means for subsequently transferring said stored heat to said first working fluid.

22. The waste heat recovery system of claim 21 wherein said temporary storing means includes a reservoir and a salt contained therein, said salt having a melting temperature below the temperature of said exhaust, and a first heat exchanging means for transferring waste heat from the exhaust to said salt to melt said salt wherein heat is stored therein as heat of fusion, and said means for subsequently transferring said stored heat to said first working fluid includes a second heat exchanging means for transferring said stored heat to said first working fluid as said melted salt fuses.

* * * * *